United States Patent
Krekeler

[15] 3,697,137
[45] Oct. 10, 1972

[54] RESILIENT MOUNTING FOR CUTTING TOOLS OF MINING MACHINES AND THE LIKE

[72] Inventor: Claude B. Krekeler, Cincinnati, Ohio

[73] Assignee: The Cincinnati Mine Machinery Co., Cincinnati, Ohio

[22] Filed: Dec. 15, 1969

[21] Appl. No.: 885,255

[52] U.S. Cl. ..................299/86, 175/354, 299/92
[51] Int. Cl. ..................E21c 25/12, E21c 25/46
[58] Field of Search ..................299/86; 308/159, 166

[56] References Cited

UNITED STATES PATENTS 2,955,809 10/1960 Herrmann..............299/86 X
3,554,605 1/1971 Elders..................299/86
2,708,609 5/1955 Triplett..................308/159

*Primary Examiner*—Ernest R. Purser
*Attorney*—Melville, Strasser, Foster & Hoffman

[57] ABSTRACT

In the combination of a cutting tool for a mining machine or the like, a tool mounting lug and means for mounting the lug, a resilient means in association with the lug permitting limited movement of the cutting tool in at least a direction substantially opposite the cutting direction so as to ease the load on the cutting tool and permit the cutting tool to build up a fracturing pressure against the material being cut.

24 Claims, 21 Drawing Figures

PATENTED OCT 10 1972

INVENTOR/S
CLAUDE B. KREKELER,

BY Melville, Strasser, Foster and Hoffman
ATTORNEYS

INVENTOR/S
CLAUDE B. KREKELER,

INVENTORS

CLAUDE B. KREKELER,

BY *Melville, Strasser, Foster and Hoffman*
ATTORNEYS

INVENTOR/S
CLAUDE B. KREKELER,

INVENTOR/S

CLAUDE B. KREKELER,

BY Melville, Strasser, Foster and Hoffman
ATTORNEYS

INVENTOR/S
CLAUDE B. KREKELER,

BY *Melville, Strasser, Foster and Hoffman*
ATTORNEYS

RESILIENT MOUNTING FOR CUTTING TOOLS OF MINING MACHINES AND THE LIKE

BACKGROUND OF THE INVENTION

1. Field of the Invention

The invention relates to improvements in cutting tool, lug and mounting means combinations, for mining machines and the like, and more particularly to such combinations having means for resiliently mounting the cutting tools.

2. Description of the Prior Art

Prior art workers have devised many forms of mining machines, capable of moving a plurality of cutting tools in a cutting direction against the face of material to be cut. The cutting tools, themselves, may take many forms. For example, a cutting tool may comprise an elongated shank portion of rectangular cross section and a head portion having a hard cutting tip. The shank portion is adapted to be received in a perforation (having a rectangular cross section) in a lug member and to be maintained therein by a retaining means. Generally, one or more abutment surfaces are provided in association with the head portion, the abutment surfaces are adapted to cooperate with a surface or surfaces on the lug to determine the gauge or depth to which the shank portion extends into the shank receiving perforation. U.S. Pat. No. 3,114,537 teaches a number of embodiments of such cutting tools and lugs therefor.

In another form, the cutting tool may be made of round stock, having a cylindrical shank with a cutting tip at at least one end. Such a cutting tool has an abutment surface at at least the other end. The shank of the cutting tool is adapted to be received in a perforation of circular cross section in a lug member. The shank receiving perforation in the lug has, in association therewith, an abutment surface adapted to cooperate with the abutment surface on the cutter bit to determine the gauge of the cutter bit and to keep the cutter bit from rotating within the shank receiving perforation. Again, retaining means are provided to maintain the cutter bit shank in the shank receiving perforation. Exemplary embodiments of such cutting tools are taught in the copending application entitled CUTTER BITS AND MEANS FOR MOUNTING THEM, Ser. No. 842,791 filed June 30, 1969 in the name of the same inventor, and which is a continuation in-part application of the copending application entitled CUTTER BITS AND MEANS FOR MOUNTING THEM, Ser. No. 753,398, filed Aug. 19, 1968, in the name of the same inventor, now abandoned.

Yet another form of cutter bit may be described as a "pick-type" bit. Such a bit comprises an elongated shank portion (generally of circular cross section) and has a conical nose or head portion at one end at least. The conical head terminates in a cutting tip. In many pick-type bits, the shank portion of circular cross section is freely rotatable in the shank receiving perforation of a lug. Again, retaining means are provided to maintain the shank portion in the shank receiving perforation. In a more recent development, the end of the shank portion, opposite the conical head, terminates in a gauge-determining abutment surface. The lug for such bits has, in association with the rear end of its shank receiving perforation, an abutment surface adapted to cooperate with the bit abutment surface. The lug and bit abutment surfaces may have a male-female engagement, when desired. Examples of such pick-type bits are taught in United States Letters Patent Nos. 3,397,012 and 3,397,013.

In all of the embodiments mentioned above, the lugs for supporting the bits are affixed to or comprise an integral part of a mounting means. The mounting means may take various forms including cutting or ripping chains, cutter wheels, cutter arms and the like. The mounting means, comprising a part of the mining machine, are driven by the mining machine in a cutting direction and hence the mounting means, themselves, drive the cutting tool-lug combinations in the cutting direction. In addition to this, the entire mining machine, or at least the mounting means, may be moved in an advancing direction, which is to be distinguished from the cutting direction. Thus, as the cutting tools are moved in the cutting direction and cut away at the face of the material being mined, they are simultaneously advanced against this face so that a continuous cutting operation may be obtained.

In recent years, mining machines have become more powerful. The cutting tools of such heavy duty mining machines, operating continuously during the mining operation, are subjected to heavier and more continuous strains. The resilient mountings of the present invention ease the load on the cutting tips of the cutting tools. When rotatable bits are used, they will tend to rotate more freely. Simultaneously, the resilient mountings allow pressure to be built up between the cutting tools and the material being mined, so as to fracture the material being mined. Cracks in the material, formed in the cutting operation, tend to propogate faster. When the material gives way, the fracturing pressure is released imparting a "kick" to the bit. As a result of the above, the cutting tool-lug-mounting means assemblies, provided with the resilient mountings taught herein, are characterized by longer service life. In addition, the assemblies of the present invention feed in the advancing direction more readily.

SUMMARY OF THE INVENTION

The present invention relates to cutting tool-lug-mounting means combinations provided with resilient means such as to permit limited movement of the cutting tool in at least a direction substantially opposite the cutting direction.

In one embodiment, a pick-type bit is rotatively mounted in the shank receiving perforation of a lug. The bit has a gauge-determining abutment surface at its rear end. The lug has an anvil portion supporting an abutment surface adapted to cooperate with the bit abutment surface. Between the anvil portion of the lug and the lug abutment surface there is located a resilient insert. In another embodiment, the anvil portion of the lug supports a resilient member which, itself, provides the lug abutment surface. Both of these embodiments permit linear motion of the cutting tool along its axis.

In another embodiment, the mounting means for the lug has two spaced, upwardly extending projections. The forward end of the lug lies between these projections and is pivoted thereto by a pivot pin passing through perforations in the projections and the lug. Between the upper surface of the mounting means and the lower surface of the lug there is located a pad of resilient material. In such an embodiment, the lug and the cutting tool it bears may be of any suitable type. In this embodiment the lug and cutting tool combination is allowed limited movement in an arcuate path about the pivot pin.

In yet another embodiment, the upper portion of the mounting means supports a block of resilient material. The cutting tool-bearing lug has its bottom end buried in the block of resilient material. This structure permits limited universal movement of the lug-cutting tool combination. Again, this version is not limited to any particular lug-bit combination.

Additional resilient motion of the cutter bit may be achieved by combining the last mentioned embodiment and the previously mentioned pivoted embodiment, as will be described hereinafter.

In the embodiments above described the resilient insert may be replaced by metallic spring means where desired.

DESCRIPTION OF THE PREFERRED EMBODIMENTS

As will be evident hereinafter, the concept of the present invention is not necessarily limited, in all of its embodiments, to particular types of cutting tools, lugs or mounting means. As a consequence, the present invention will be described with respect to a number of exemplary but non-limiting embodiments.

Figure 1:
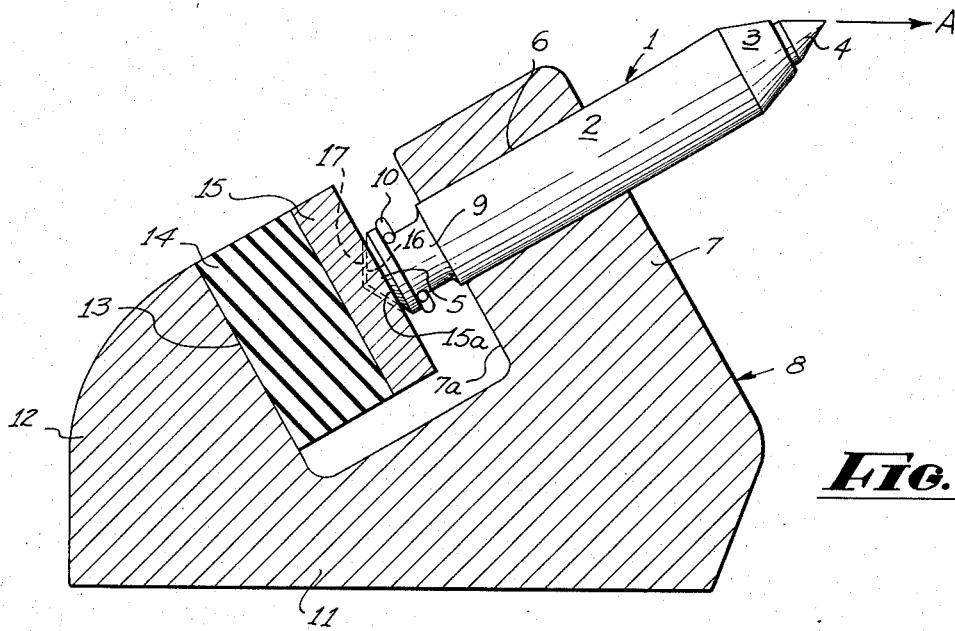
FIG. 1 is an elevational view of a lug-cutting tool combination, partly in cross section, and illustrates one embodiment of the present invention wherein a resilient insert is located between the lug abutment surface and the anvil portion of the lug.

FIG. 1 illustrates a lug and cutter bit of the general type taught in the above mentioned United States Letters Patents Nos. 3,397,012 and 3,397,013. A cutter bit, generally indicated at 1, comprises a cylindrical shank portion 2. At one end of the shank there is a conical nose or head portion 3, terminating in a hard cutting tip 4. At the other end of the shank 2 there is a gauge-determining abutment surface 5.

The cutter bit 1 is illustrated as mounted in the shank receiving perforation 6 of the body portion 7 of a lug, generally indicated at 8. As an exemplary form of retaining means, to maintain the cutter bit in the shank receiving perforation during the cutting operation, the bit is illustrated as having an annular notch 9 at its rearward end. A resilient, split metal ring 10 is engaged on the cutter bit in the notch 9. The outside diameter of the ring 10 is slightly greater than the diameter of the shank receiving perforation 6, so that the ring will prevent removal of the cutter bit from the shank receiving perforation.

The lug 8 has a rearwardly extending portion 11 terminating in an anvil 12. The anvil 12 has a surface 13 facing the rear surface 7a of the body portion of the lug 8. Affixed to the surface 13 there is a resilient insert 14. The insert 14 may be affixed to the surface 13 by any suitable means, including gluing, vulcanizing or the like. In similar manner, the insert 14 is also affixed to the rear surface of an abutment means 15. The forward surface 15a of the abutment means is adapted to cooperate with the abutment surface 5 of the cutter bit, to determine the gauge or depth to which the cutter bit extends in the shank receiving perforation 6.

From the above description, it will be evident that the abutment means 15 is resiliently mounted with respect to the anvil 12 of the lug, by virtue of the resilient insert 14. Thus, when the lug and cutter bit assembly is moved in the cutting direction (indicated by arrow A) and when the cutting tip 4 encounters material to be cut, the cutter bit 1 may move axially, compressing the resilient material 14. This axial movement of the cutter bit is substantially opposite to the cutting direction and the compressive load is distributed over the larger area of the resilient material. As the assembly moves further in the cutting direction, the cutting tip will cause cracks in the material it is engaging. The compressed resilient insert 14 will additionally bias the cutter bit toward the cutting direction, causing the cracks to propogate faster. Thus, while the axial movement of the cutter bit 1 will ease the load on the tip 4, it will also compress the resilient insert 14 building up a fracturing pressure. When the cracks propogate and the material finally gives way before the cutting tip 4, the compressive forces on the resilient material will cease, the fracturing pressure will be released and the resilient material will impart a "kick" to the bit.

The structure illustrated in FIG. 1 may have a male-female engagement between the bit and lug abutment surfaces, as taught in the above mentioned United States Letters Patent No. 3,397,013. For purposes of an exemplary illustration, the bit may be provided with a conical abutment surface, shown in dotted lines at 16. The abutment means 15 may be provided with a conical depression, shown in dotted lines at 17. Such a male-female fit will tend to maintain the proper alignment of the bit 1 within the shank receiving perforation 6, and will prevent undue wear of the shank receiving perforation.

In FIG. 1 and the other embodiments to be described hereinafter, the resilient material may be any suitable elastomeric substance such as rubber, neoprene, urethane, butyl or the like.

Figure 2:
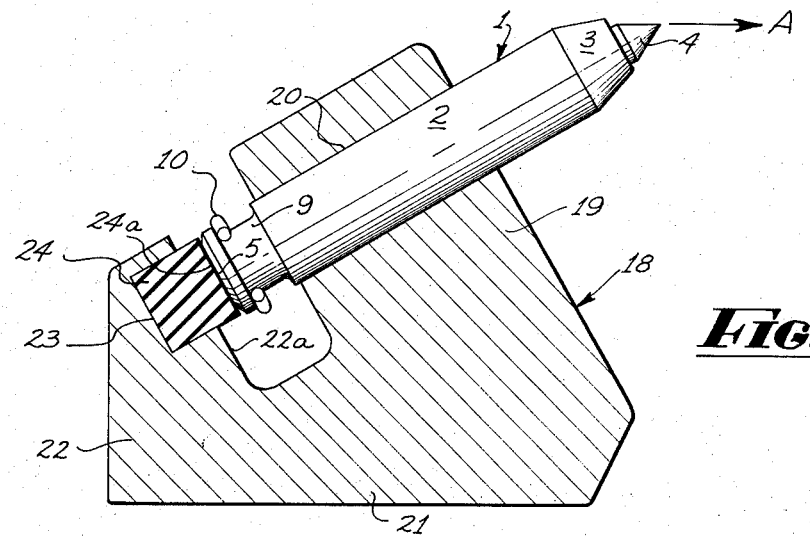
FIG. 2 is an elevational view of a lug-cutting tool assembly, partly in cross section, and illustrates another embodiment of the present invention wherein the anvil portion of the lug supports an abutment means which, itself, is made of resilient material.

FIG. 2 illustrates a cutter bit-lug assembly similar to that of FIG. 1. The cutter bit is identical, and like parts have been given like index numerals.

The lug, generally indicated at 18, has a body portion 19, a shank receiving perforation 20, a rearward extension 21 and an anvil portion 22. In this instance, however, the forward surface 22a of the anvil portion has a depression or hole 23 therein. A resilient member 24 is affixed in the hole 23, again by any suitable means such as gluing, vulcanizing or the like. The forward end of the resilient member 24 extends beyond the forward surface 22a of the anvil and presents an abutment surface 24a. The abutment surface 24a is adapted to cooperate with the abutment surface 5 on the cutter bit. The bit abutment surface 5 and the resilient member abutment surface 24a may be configured to provide a male-female fit, as desired.

In the embodiment of FIG. 2, as the cutter bit-lug assembly is moved in the cutting direction A, the cutter bit is again capable of linear motion along its axis, compressing the resilient member 24. The result of this, and the action of the cutter bit, is the same as that described with respect to the embodiment of FIG. 1. In addition, however, the resilient material is more easily retained in this embodiment.

In embodiments of the type shown in FIGS. 1 and 2 it is within the scope of the invention to substitute metallic spring means for the resilient material 14 or 24, as will be described hereinafter.

Figure 3A:
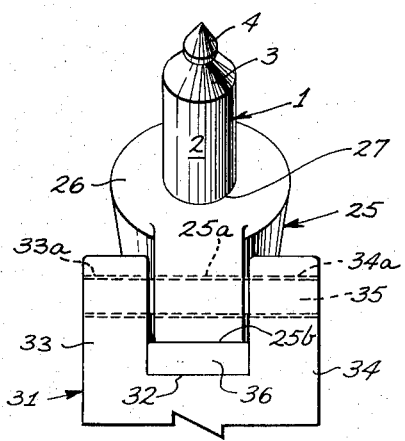
FIG. 3a is a fragmentary elevational view of the structure of FIG. 3, as seen from the right in FIG. 3.
Figure 3:
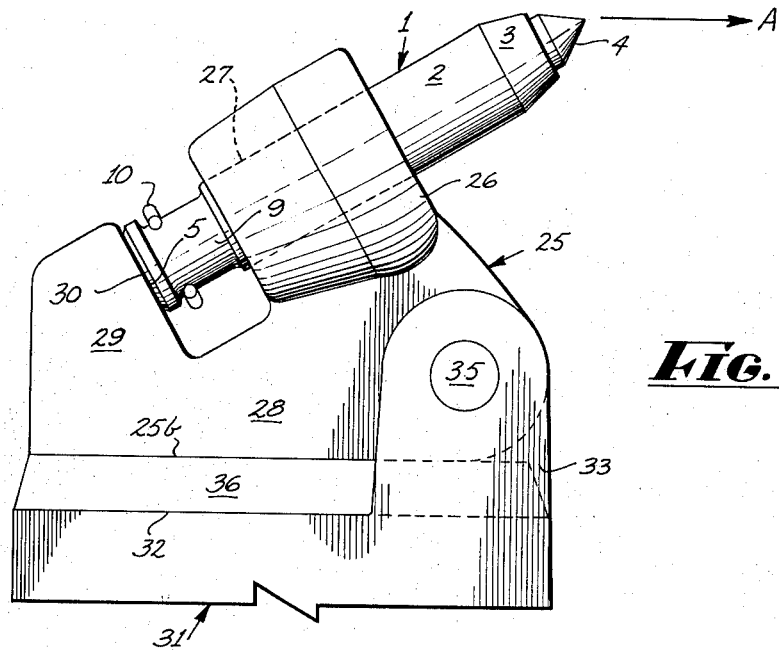
FIG. 3 is a fragmentary elevational view of a mounting means-lug-cutting tool assembly, wherein the lug is pivotally affixed to the mounting means with a resilient pad located therebetween.

FIGS. 3 and 3a illustrate another embodiment of the invention. In this embodiment, for purposes of an exemplary showing, the cutter bit is illustrated as being identical to the bits of FIGS. 1 and 2, and like parts have been given like index numerals. The lug, generally indicated at 25, is similar to the lugs of FIGS. 1 and 2. The lug comprises a body portion 26 having a shank receiving perforation 27, a rearward extension 28, an anvil member 29 and an abutment surface 30, adapted to cooperate with the abutment surface 5 on the cutter bit.

FIGS. 3 and 3a also illustrate a mounting means, generally indicated at 31. The mounting means 31 may be of any suitable type. For example, it may comprise the link of a cutter chain, or it may comprise an integral part of a cutting arm, cutting wheel or the like. The upper surface 32 of the mounting means has two upwardly extending, spaced projections 33 and 34. The projections 33 and 34 have coaxial holes 33a and 34a, respectively.

It will be seen from these figures that the forward end of the lug 25 has a transverse perforation 25a. The forward end of the lug is of such width as to fit between the upstanding projections 33 and 34 with the perforation 25a in coaxial alignment with the perforations 33a and 34a. The coaxial perforations are adapted to receive a pivot pin 35 so that the lug 25 is pivotally affixed at its forward end to the mounting means 31.

The manner in which the pivot pin is held in place does not constitute a limitation on the present invention. For example, the pivot pin 35 may have a press fit in the perforations 33a and 34a, with the perforation 25a being of such diameter that the lug is freely rotatable about the pin. Alternatively, the pin may have a press fit in the perforation 25a and be freely rotatable in the perforations 33a and 34a. The pin may be welded to projections 33 and 34, or it may be headed at one end and provided with removable fastening means at the other. Similarly, the pin may be threaded into perforations 33a and 34a or perforation 25a. In addition, various mechanical expedients (not shown) may be used to hold the pivot pin 35 in place such as snap rings, roll pins, nuts or the like.

As shown in FIGS. 3 and 3a, a pad 36 of resilient material is located between the bottom surface 25b of the lug 25 and the top surface 32 of the mounting means 31. The resilient pad 36 is affixed to one or both of the surfaces 25b and 32 by any suitable means inclusive of vulcanizing, gluing, mechanical means and the like.

From the above, it will be immediately evident that when the cutter bit, lug and mounting means assembly is moved in the cutting direction A, resistance encountered by the cutting tip 4 will cause the entire cutter bit and lug assembly to pivot or rock about the pivot pin 35, compressing the resilient pad 36. As in the case of the embodiments of FIGS. 1 and 2, this will not only ease the load on the cutting tip 4, but also the compression of the resilient pad 36 will allow the build-up of pressure to fracture the material being cut, causing the cracks therein to propogate faster and imparting a "-kick" to the cutter bit when the material being cut gives way. Movement of the tip 4 in the embodiment of FIGS. 3 and 3a differs from the tip movement in the embodiments of FIGS. 1 and 2 in that the tip moves rearwardly in an arcuate path about the pivot pin 35, rather than linearly along the axis of the bit. Both motions, however, may be considered to be substantially opposite to the cutting direction A. In the embodiment of FIGS. 3 and 3a the shank receiving perforation 27 will wear less rapidly. A larger area of resilient material is provided for compression and the arcuate movement of the bit will give even better breaking or fracturing action than will the straight line movement of the embodiments of FIGS. 1 and 2.

Figure 4:
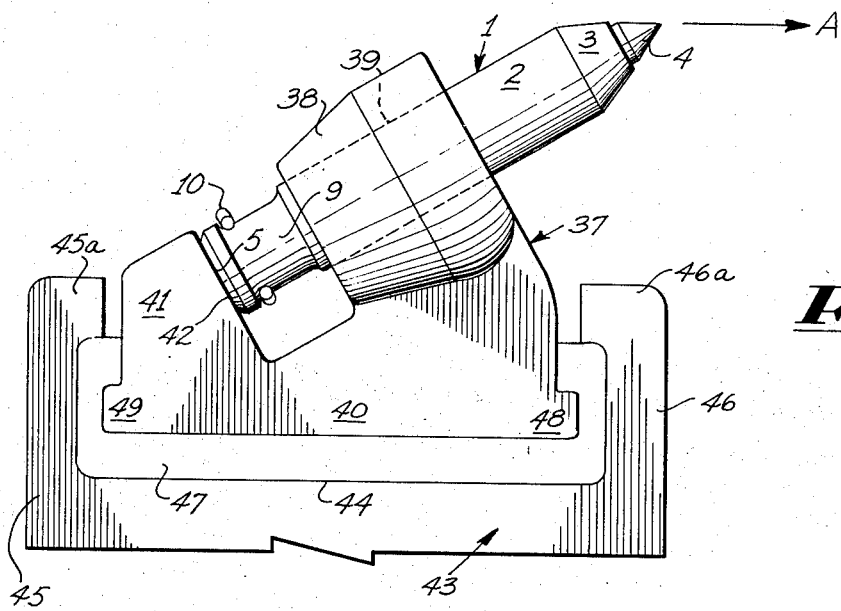
FIG. 4 is a fragmentary elevational view of a mounting means-lug-cutting tool assembly wherein the lug is mounted in a resilient block supported by the mounting means.

FIG. 4 illustrates yet another embodiment of the present invention. Again, for purposes of illustration, a cutter bit is shown identical to the bits of FIGS. 1 through 3 and like parts have been given like index numerals. The lug, generally indicated at 37, is substantially identical to the previously described lugs. The lug 37 comprises a body portion 38 having a shank receiving perforation 39 therethrough, a rearward extension 40 and an anvil portion 41, having an abutment surface 42 adapted to cooperate with the gauge-determining abutment surface 5 on the cutter bit 1.

FIG. 4 fragmentarily illustrates a portion of a mounting means, generally indicated at 43. As in the embodiment of FIG. 3, the mounting means 43 may comprise the link of a cutter chain, or a portion of a cutting arm, cutting wheel or the like. The upper surface 44 of the mounting means has upstanding projections 45 and 46 at either end thereof. Preferably, the projections 45 and 46 have inturned upper ends 45a and 46a. The mounting means upper surface 44 and its projections 45 and 46 define a space to be filled with resilient material 47. The bottom portion of the lug 37 is buried in the resilient material 47. The resilient material is mechanically held in place by the inturned ends 45a and 46a of the mounting means projections and may additionally be affixed to the mounting means or the lug (or both) by any suitable means inclusive of vulcanizing, gluing, or the like. In a similar manner, the bottom portion of the lug 37 may be provided with forward and rearward extensions 48 and 49, when desired, to give added strength to the mounting of the lug in the resilient material.

The movement of the cutter bit tip in the embodiment of FIG. 4 differs from that of the previously described embodiments in that the mounting provides limited movement in substantially all directions. The limits of the movement will be determined by the compressibility of the resilient material 47. Again, the resilient material is capable of imparting a "kick" to the cutter bit and to relieve the load on the cutter bit tip. The embodiment of FIG. 4 is more adapted to easy cutting conditions.

The embodiment illustrated in FIGS. 3 and 3a is not limited with respect to the type of lug and cutter bit combination to which it is applicable. This is demonstrated by the exemplary embodiments illustrated in FIGS. 5 through 8.

Figure 5:
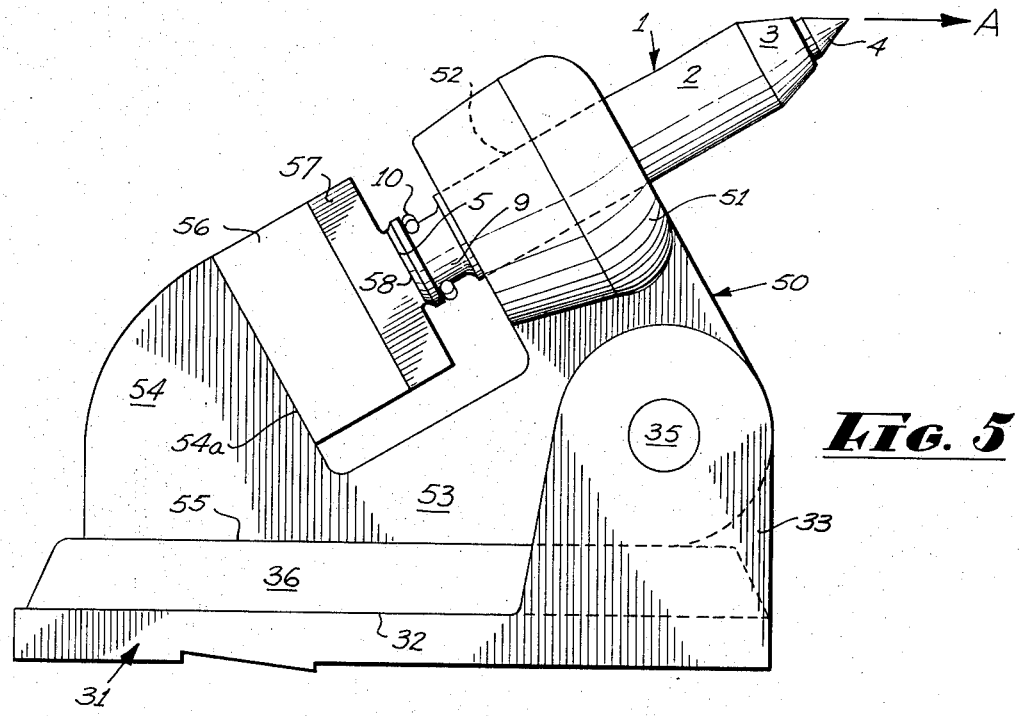
FIGS. 5 through 8 are fragmentary elevational views of embodiments similar to FIG. 3 illustrating various types of lug-cutting tool combinations pivotally affixed to the mounting means.

Turning first to FIG. 5, the structure shown therein comprises a combination of the embodiments of FIGS. 1 and 3. The cutter bit illustrated is identical to that shown in FIG. 1 and like parts have been given like index numerals. The mounting means is identical to that shown in FIGS. 3 and 3a, and again like parts have been given like index numerals. The lug, generally indicated at 50, differs from the lug 8 of FIG. 1 primarily in that its forward end is provided with a transverse perforation. As in the embodiment of FIG. 1, the lug 50 has a body portion 51, a shank receiving perforation 52, a rearward extension 53, an anvil portion 54 with a forward surface 54a and a bottom surface 55. Affixed to the surface 54a there is a resilient insert 56, identical to the resilient insert 14 of FIG. 1. Similarly, there is an anvil member 57 having an abutment surface 58, again identical to the anvil member 15 of FIG. 1. Between and affixed to the bottom lug surface 55 and/or the top mounting means surface 32 there is a resilient pad 36.

In the embodiment of FIG. 5, the cutter bit top 4 is capable not only of the rocking motion described with respect to FIG. 3, but also the linear motion described with respect to FIG. 1. Thus, the cutter bit top 4 can move in a direction substantially opposite to the cutting direction A not only by virtue of the compression of resilient insert 56, but also by virtue of the compression of the resilient pad 36. The cutter bit tip is capable of having imparted to it a "kick" both by virtue of the resilient pad 36 and the resilient insert 56.

Figure 6:
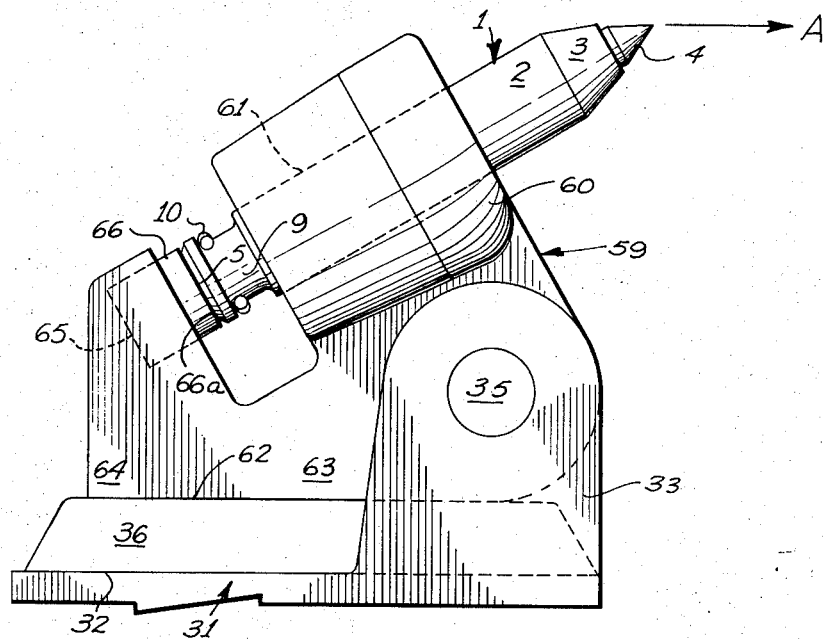

FIG. 6 illustrates a structure comprising the resilient mounting shown in FIG. 3 combined with a lug and cutter bit assembly similar to that shown in FIG. 2. Again, the mounting means and the cutter bit are identical with those described with respect to FIGS. 3 and 2, respectively, and like parts have been given like index numerals. The lug, generally indicated at 59, differs from that shown in FIG. 2 primarily in that its forward end is provided with a transverse perforation for receipt of the pivot pin 35. Again, the lug 59 has a body portion 60, a shank receiving perforation 61, a bottom surface 62, a rear extension 63 and an anvil portion 64. The anvil portion 64 has a perforation or hole 65 therein, similar to the hole 23 in FIG. 1. A resilient means 66 is affixed in the hole 65 and presents an abutment surface 66a adapted to cooperate with the abutment surface 5 of the cutter bit. The resilient means 66 is substantially identical to the resilient means 24 of FIG. 2.

The cutting tip of the cutter bit of FIG. 6 is capable of substantially the same movement as that described with respect to the cutting tip of the assembly of FIG. 5. The structure in FIG. 6 is such as to render the cutting top capable of the linear, axial movement described with respect to FIG. 2 and the rocking movement described with respect to FIG. 3.

Figure 7:
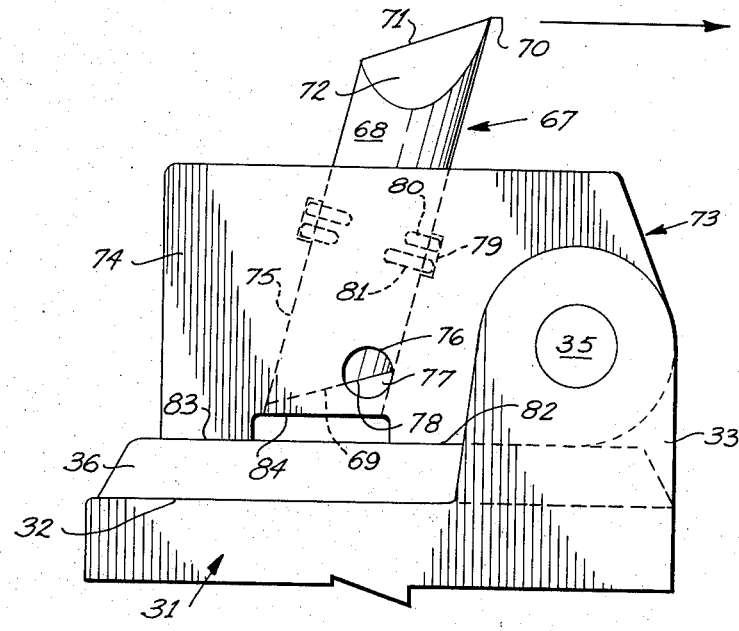

FIG. 7 illustrates the combination of the mounting means described with respect to FIG. 3 and the lug and cutter bit combination of the general type taught in the above mentioned copending application. Again, the mounting means is identical to that shown in FIG. 3 and like parts have been given like index numerals. The cutter bit generally indicated at 67 is exemplary of the various embodiments taught in the copending application. It comprises a cylindrical shank 68 having an abutment surface 69 at one end and a cutting top 70 at the other. The cutting end of the bit is provided with a clearance surface 71 and a relief on either side of the clearance surface (one of which is shown at 72).

The lug, generally indicated at 73 is again exemplary of the lugs taught in the above identified copending application. The lug comprises a body 74 having a shank receiving perforation 75 extending therethrough. The shank receiving perforation is intersected by a transverse hole 76 containing a pin 77 having an abutment surface 78 which cooperates with the bit abutment surface 69, not only to determine the gauge of the bit, but also to prevent the bit from rotating.

FIG. 7 also illustrates an exemplary form of retaining means comprising an annular groove 79 in the shank receiving perforation 75 adapted to receive a pair of split-metal rings 80 and 81. The split-metal rings engage the cutter bit shank 68 and have an outside diameter greater than the shank receiving perforation 75.

The resilient pad 36 is affixed to the upper surface 32 of the mounting means 31 or the bottom surfaces 82 and 83 of the lug 73, or both. Preferably, that portion 84 of the lug bottom through which the shank receiving perforation 75 opens, is spaced from the resilient pad 36 to prevent the accumulation of fines and foreign material in the shank receiving perforation.

It will be evident, that when a force is exerted on the cutting tip 70, it may rock or pivot rearwardly about the pivot pin 35, compressing the pad 36. This not only eases the load on the tip 70 but enables the resilient pad 36 to impart a "kick" to the bit, in a manner similar to that described with respect to FIG. 3.

Figure 8:
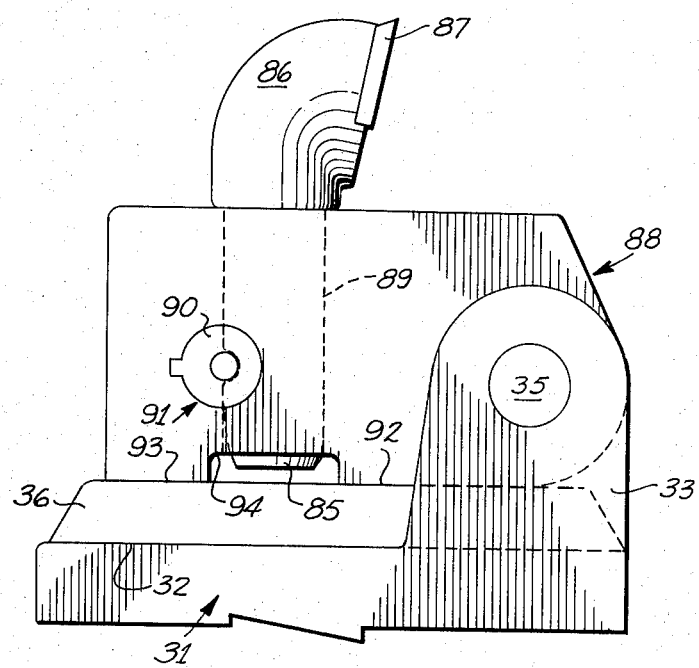

FIG. 8 illustrates a lug and cutter bit assembly, of the general type taught in the above mentioned U.S. Letters Patent No. 3,114,537, provided with the resilient mounting of the type taught in FIG. 3. Again, the mounting means is identical to that shown in FIG. 3 and like parts have been given like index numerals.

The cutter bit of FIG. 8 comprises an elongated shank portion 85 of the rectangular cross section, surmounted by a head portion 86 having a hard cutting tip 87. The lug, generally indicated at 88, has a shank receiving perforation 89 adapted to receive the bit shank 85. The lug also has a transverse perforation 90 partially intersecting the shank receiving perforation and adapted to receive a resilient retaining means, generally indicated at 91.

In the embodiment of FIG. 8, the forward end of the lug 88 is rounded and has a transverse perforation for the receipt of the pivot pin 35. Again, the resilient pad 36 is affixed to the upper surface 32 of the mounting means 31 or the bottom surfaces 92 and 93 of the lug, or both. Preferably, that portion 94 of the lug bottom, through which the shank receiving perforation opens, is spaced from the pad 36 to prevent accumulation of fines and foreign material in the shank receiving perforation.

As in the structures described with respect to FIGS. 3 and 5 through 7, the cutting tip 87 is capable of arcuate movement about the pivot pin 35, by the compression of the resilient pad 36 and will have imparted to it a "kick" by the resilient pad.

As in the case of the resilient mounting of FIG. 3, the resilient mounting described with respect to FIG. 4 is not limited in the type of cutter bit and lug assembly to which it may be applied. This is exemplified by the structure shown in FIGS. 9 through 12. In all of these figures, the mounting means and resilient member are substantially identical to those of FIG. 4, and like parts have been given like index numerals.

Figure 9:
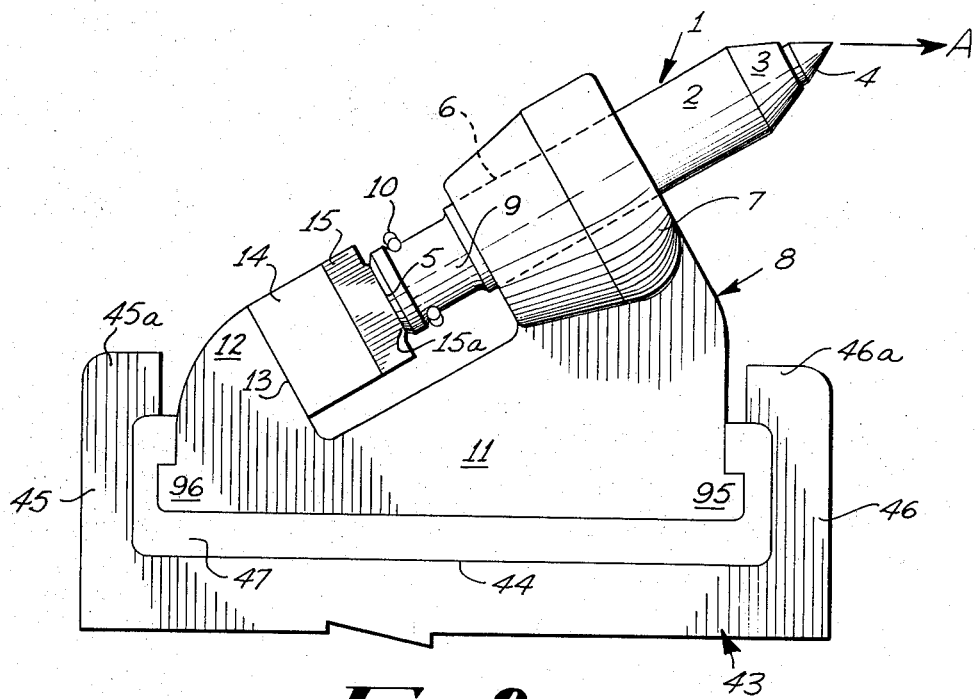
FIGS. 9 through 12 are fragmentary elevational views similar to that of FIG. 4 illustrating various types of lug-cutting tool combinations mounted in a resilient block supported by the mounting means.

FIG. 9 illustrates the mounting means of FIG. 4 provided with a lug and cutter bit of the type shown in FIG. 1. The lug and cutter bit of FIG. 9 are identical to those of FIG. 1 and like parts have been given like index numerals. When desired, the lug 8 may be provided with forward and rearward extensions 95 and 96 to increase the strength of the mounting of the lug in the resilient material 47.

In the structure illustrated in FIG. 9, the cutting tip 4 is capable not only of the limited universal movement provided by the resilient insert 14.

Figure 10:
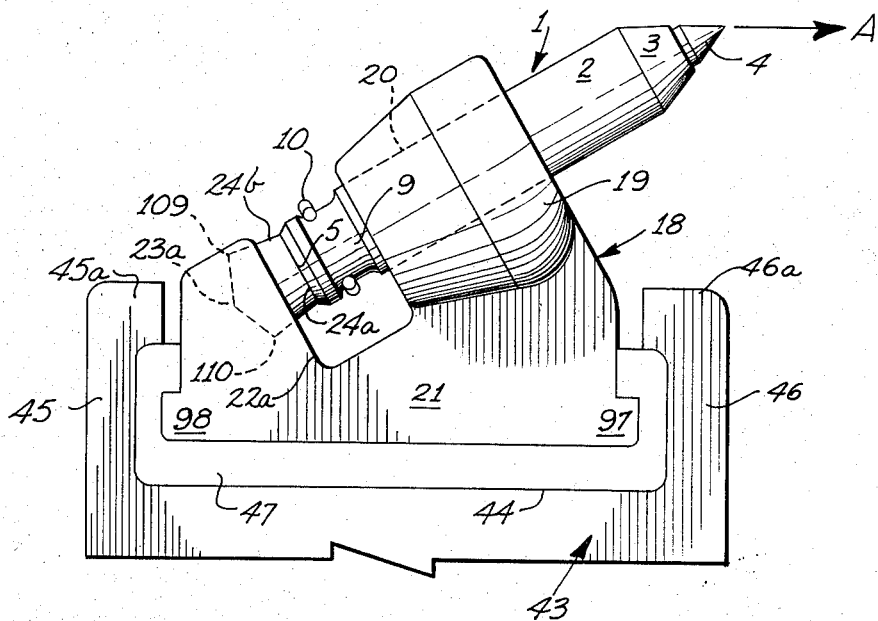

FIG. 10 illustrates the combination of a resilient mounting of the type described with respect to FIG. 4 as applied to a lug and cutter bit assembly of the type shown in FIG. 2. The lug and cutter bit are substantially identical to those shown in FIG. 2, and like parts have been given like index numerals. Again, the lug 18 may be provided with forward and rearward extensions, when desired, as shown at 97 and 98. The resilient member 24b differs slightly from the resilient member 24 of FIG. 4 (as will be described hereinafter) but its function is identical.

As in the structure illustrated in FIG. 9, the assembly of FIG. 10 enables a limited universal movement of the cutter bit tip provided by resilient material 47 and the linear, axial movement thereof, provided by resilient member 24.

Figure 11:
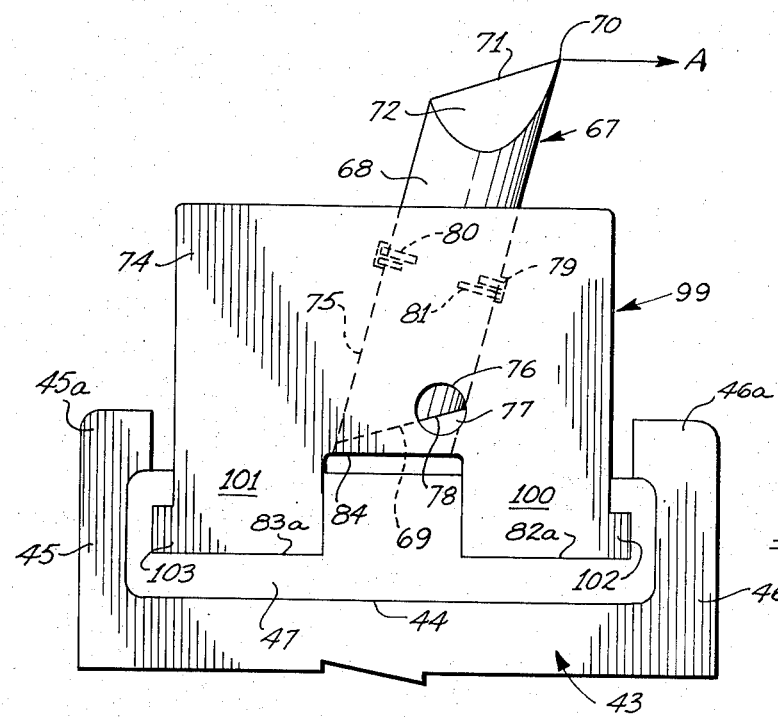

FIG. 11 shows the resilient mounting means of the type shown in FIG. 4 provided with a cutter bit and lug assembly of the type described with respect to FIG. 7. In FIG. 11, the cutter bit is identical to the cutter bit 67 of FIG. 7 and like parts have been given like index numerals. The lug, generally indicated at 99, is substantially identical to the lug 73 of FIG. 7 and like parts have been given like index numerals.

The lug 99 differs from the lug 73 primarily in that no transverse perforation is provided in the lug 99 for the receipt of a pivot pin. In addition, the lower portions of the lug 99 are extended, as at 100 and 101, terminating in bottom surfaces 82a and 83a. The portions 100 and 101 may be provided with extensions 102 and 103, respectively, when desired.

In the structure shown in FIG. 11, the cutting tip is capable of limited universal movement, similar to that described with respect to the cutting tip 4 in FIG. 4.

Figure 12:
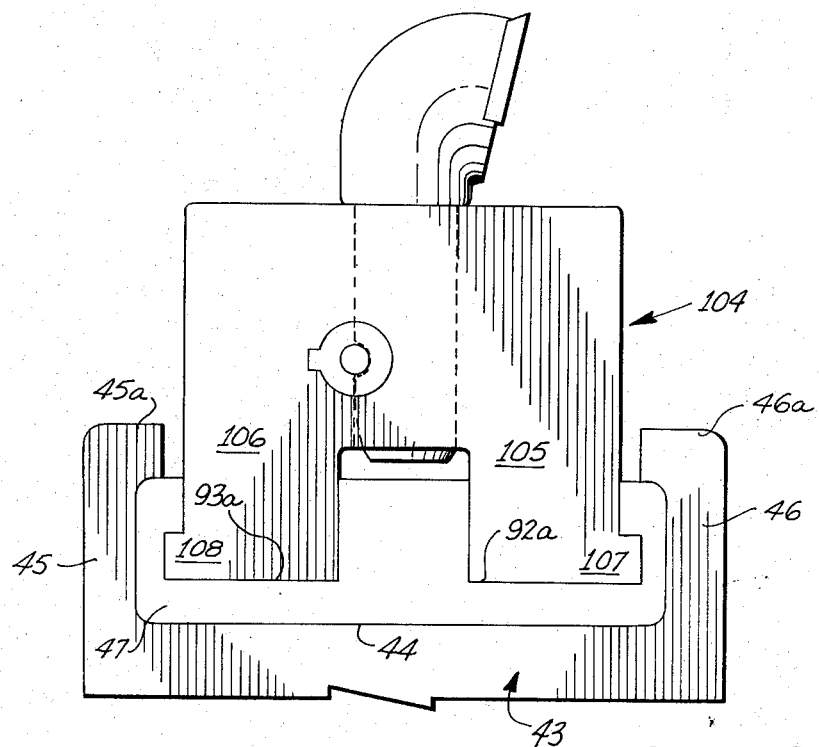

FIG. 12 illustrates a resilient mounting means of the type shown in FIG. 4 provided with a lug and cutter bit assembly of the general type shown in FIG. 8. The cutter bit of FIG. 12 is identical to that shown in FIG. 8, and like parts have been given like index numerals. The lug, generally indicated at 104, is substantially identical to the lug 88 of FIG. 8, and again like parts have been given like index numerals.

The lug 104 differs from the lug 88 of FIG. 8, in that no transverse perforation for a pivot pin is provided and bottom portions of the lug are extended as at 105 and 106. These extended portions terminate in bottom surfaces 92a and 93a. As in the previously described embodiment, the lug portions 105 and 106 may be provided with extensions 107 and 108, respectively, when desired. Again, the cutting tip 87 is capable of limited universal movement, by virtue of the resilient member 47.

Figure 13:
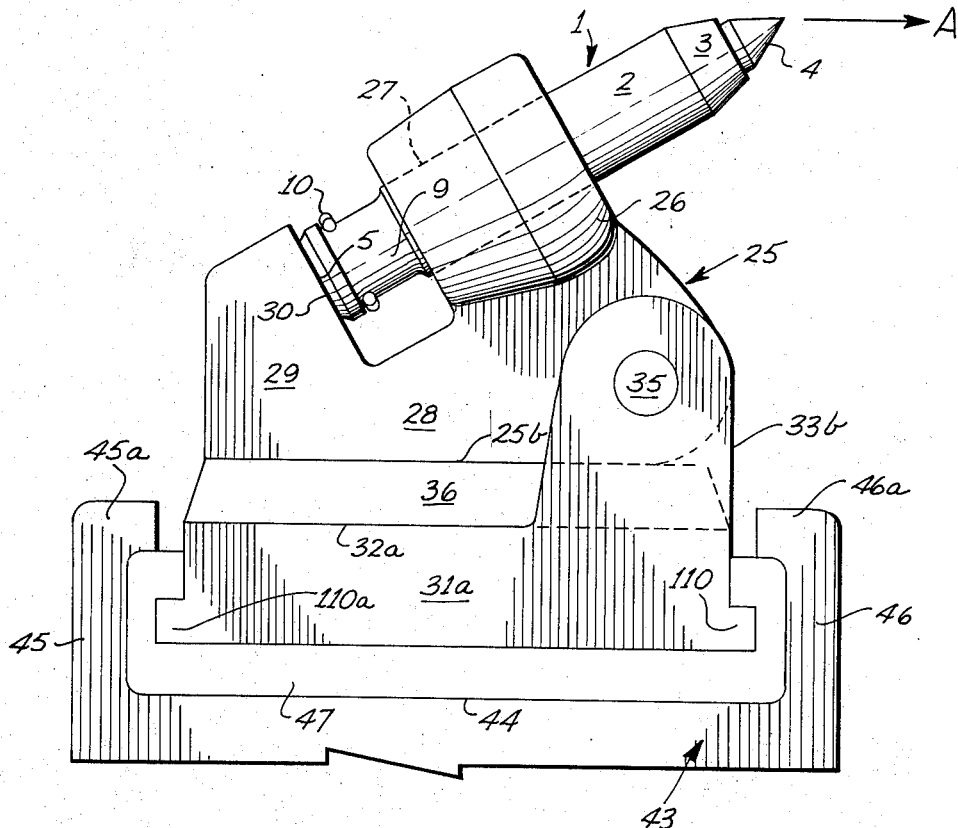
FIG. 13 is an elevational view of yet another embodiment of the mounting means-lug-cutting tool assembly of the present invention.

Additional resilient motion of the cutting tool can be obtained by combining the lug-cutting tool combination of FIGS. 3-3a, 5, 6, 7 or 8 with the mounting means assembly of FIGS. 4, 9, 10, 11 or 12. This is illustrated in FIG. 13, where for purposes of an exemplary showing, the cutting tool-lug assembly of FIG. 3 is shown combined with mounting means of FIG. 4. Since the lug and cutting tool of FIG. 13 is identical to that of FIG. 3, like parts have been given like index numerals. In this embodiment, the element 31a may be considered a part of the lug 25 and is provided with a pair of upstanding projections, one of which is shown at 33b. It will be understood that the projections on the element 31a are substantially identical to the projections 33 and 34 shown in FIGS. 3 and 3a. The lug portion 25 is pivoted between the projections by pivot pin 35 and the resilient means 36 is located between the lowermost surface 25b of the element 25 and the upper surface 32a of the element 31a. The element 31a may be provided with end extensions 110 and 110a.

The mounting means of FIG. 13 is identical to the mounting means of FIG. 4 and, again, like parts have been given like index numerals. The bottom portion of the element 31a is buried in the resilient material 47 located in the space defined by the surface 44 and projections 45 and 46 of the mounting means 43. Thus it will be seen that the structure of FIG. 13 will combine the above described resilient motions of the embodiments of FIGS. 3 and 4. It will similarly be evident that the embodiments shown in FIGS. 5, 6, 7 and 8 may similarly be provided with an element identical to the element 31a of FIG. 13 and mounted in the resilient material 47 of the mounting means 43.

Figure 14:
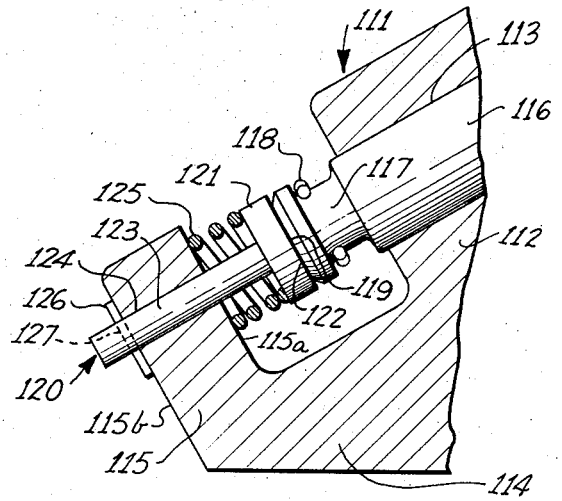
FIG. 14 is a fragmentary cross sectional view illustrating the use of a coil spring in an embodiment similar to those of FIGS. 1 and 2.

As indicated above, the resilient means of the various embodiments taught herein may be replaced by metallic spring means. For purposes of an exemplary illustration, FIG. 14 shows a mounting means 111 similar to the mounting means of FIGS. 1 and 2. The mounting means 111 has a body portion 112 with a shank receiving perforation 113 therein. A rearwardly extending portion 114 terminates in an anvil portion 115. A cutter bit 116 is shown, substantially identical to the cutter bit 1 of FIG. 1. The cutter 116 has an annular groove 117, to accept a split metal ring-type retaining means 118. The rearward surface 119 of the cutter bit comprises an abutment surface.

In this embodiment, an abutment means is provided in association with the lug 111. This abutment means, generally indicated at 120 comprises a head portion 121 bearing an abutment surface 122. The head portion 121 is mounted on a shaft 123 which is slidably mounted in a perforation 124 in the anvil portion 115 of the lug. A coil spring 125 is mounted on the shaft 123 and extends between the head 121 and the forward surface 115a of the anvil portion 115. The spring 125 tends to urge the abutment means 120 to its forwardmost position. Means are provided at that end of the shaft 123 which extends beyond the rearward surface 115b of the anvil portion 115 of the lug to render the abutment means captive within the perforation 124 and to determine its forwardmost position.

This last mentioned means may take a number of forms, including an element of larger diameter than the shaft 123 welded to the shaft end. It is preferable, however, to render the abutment means 120 removable from the perforation 123 so that it or the spring 125 may be repaired or replaced. For purposes of an exemplary illustration, the shaft 123 is shown provided with a roll pin 126 extending through a perforation 127 in the shaft.

It will be understood by one skilled in the art that a number of other removable retaining means may be affixed to the end of the shaft 123. For example, the shaft could simply be threaded and provided with a nut. Similarly, the shaft end could be provided with an annular notch to receive a split ring or spring clip. It is also within the scope of the invention to provide a permanent enlargement at the end of the shaft 123 and render the head 121 removable therefrom.

Figure 15:
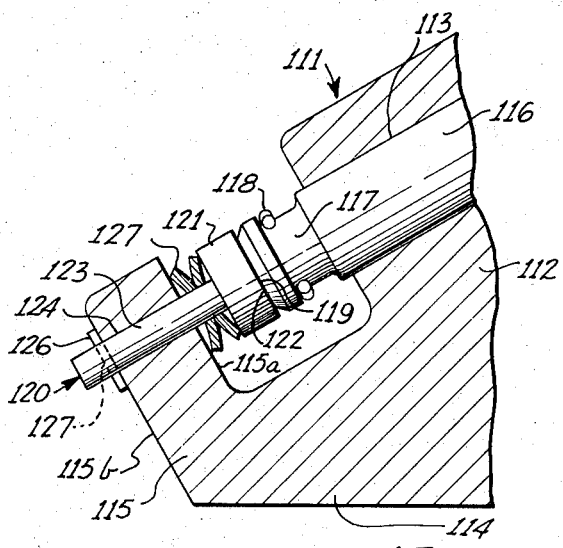
FIG. 15 is a fragmentary cross sectional view similar to FIG. 13 and illustrating the use of a Belleville spring.

FIG. 15 illustrates an embodiment identical to the embodiment of FIG. 14 with the exception that a Belleville spring 127 has been substituted for the coil spring 125. Again, like parts have been given like index numerals.

It will also be understood by one skilled in the art that the cutting tool and lug abutment surfaces may have a male-female fit, as illustrated in FIG. 1.

In all of the embodiments described, the resilient member may be held in place by means other than gluing, vulcanizing or the like. For example, it may be affixed mechanically, as by an interlocking fit. For purposes of an exemplary showing, such an interlocking fit is illustrated in FIG. 10. In this figure the hole 23a is shown as having a portion of enlarged diameter at 109. The resilient member 24b is shaped to conform to the hole 23a, being tapered and having a larger diameter at 110 than at its abutment surface 24c. Under such circumstances, the resilient member 24b will be held in place by virtue of its shape and the cooperating configuration of the hole 23a.

Under some circumstances wherein severe cutting conditions are encountered, means should be provided to prevent the compressive strength of the resilient material from being exceeded. Should this occur, all resiliency is lost and the structures of the present invention would no longer be effective to build up a fracturing pressure and to impart a kick to the cutting tool, as described above. The structures of the present invention may readily be designed for use under such severe cutting conditions by providing them with mechanical movement arresters, or stops, which will terminate the compression of the resilient means before the ultimate compressive strength thereof is exceeded.

Figure 16:
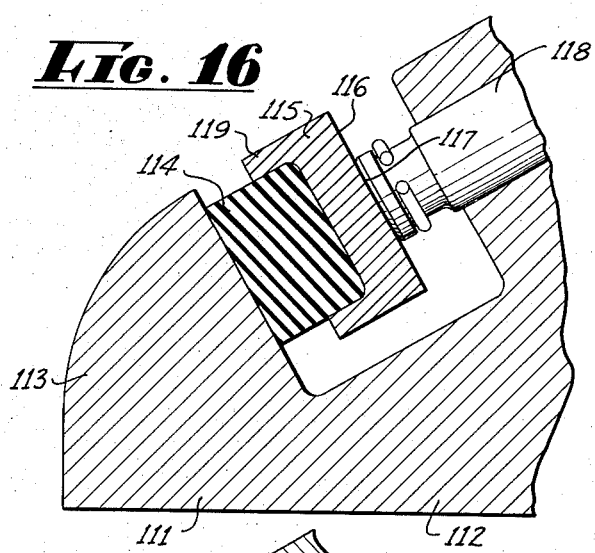
FIGS. 16–20 illustrate various stop means to prevent the compressive strength of the resilient means from being exceeded.

FIG. 16 illustrates a stop means which may be applied to structures such as those shown in FIGS. 1, 5 and 9. In FIG. 16 a lug 111 is fragmentarily illustrated, having a rearwardly extending portion 112 and an anvil portion 113. A block of resilient material 114 is affixed to the anvil portion in the same manner described with respect to FIG. 1. The resilient material 114 has affixed thereto an abutment member 115 with an abutment surface 116 adapted to cooperate with the abutment surface 117 on the cutter bit 118.

The structure of FIG. 16 differs from that of FIG. 1 primarily in that the abutment member 115 has a rearwardly extending skirt portion 119. Under severe cutting conditions, the skirt portion 119 will contact the forward face of the anvil portion 113 of the lug, and prevent further compression of the resilient material 114. The skirt 119 will be so sized as to prevent the exceeding of the resilient strength of the material 114.

It will be understood by one skilled in the art that the skirt 119 may extend about the periphery of the abutment member 115, as shown, or it may be discontinuous, comprising a plurality of rearwardly extending legs, evenly spaced about the abutment member 115.

Figure 17:
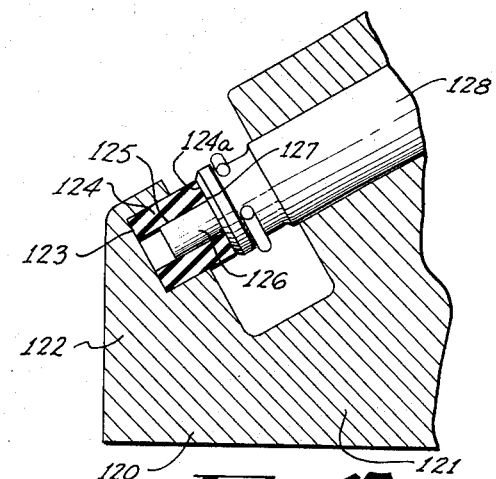

FIG. 17 illustrates stop means applicable to the structures shown in FIGS. 2, 6 and 10. The figure fragmentarily illustrates a lug 120 having a rearwardly extending portion 121 and an anvil portion 122. The anvil portion has a hole 123 therein containing a block of resilient material 124, in the same manner taught with respect to FIG. 2. The resilient member 124 differs from the resilient member 24 of FIG. 2 in that it is provided with a central perforation 125 containing a metallic pin 126. The pin 126 may be affixed in the position shown by any suitable means including vulcanizing or the like. As in the embodiment of FIG. 2, the resilient means 124 presents a forward abutment surface 124a adapted to cooperate with the abutment surface 127 of the cutter bit 128.

It will be understood by one skilled in the art that when the structure of FIG. 17 is subjected to severe cutting conditions, the pin 126 will contact the bottom of the anvil perforation 123 and will prevent the exceeding of the resilient strength of the member 124.

It will further be understood by one skilled in the art that the pin 126 could comprise an integral part of the cutter bit 128, extending rearwardly from the abutment surface 127 thereof. Under these conditions, the pin 126 would not be affixed to the member 124 and would not interfere with the rotation of the cutter bit 128.

Figure 18:
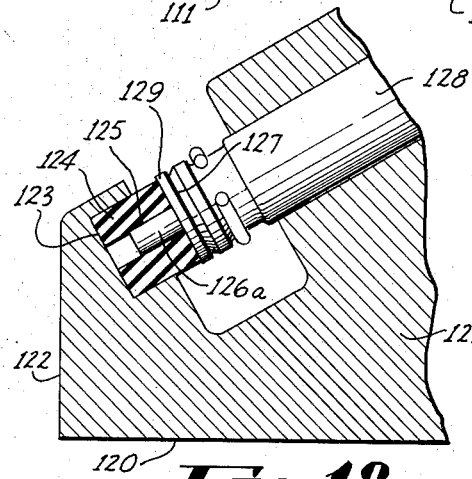

FIG. 18 shows a slight modification of the structure of FIG. 17. Like parts have been given like index numerals.

The embodiment of FIG. 18 differs from that of FIG. 17 only in that the pin 126a has an integral head 129 thereon, which serves as the abutment surface cooperating which the abutment surface 127 on the cutter bit 128. The headed pin may be affixed to the resilient member 124 by vulcanizing or the like, or it may comprise a replaceable member. In either event, it serves the dual purpose of providing the abutment surface adapted to cooperate with the bit abutment surface, and providing the stop means to protect the resilient member 124.

Figure 19:
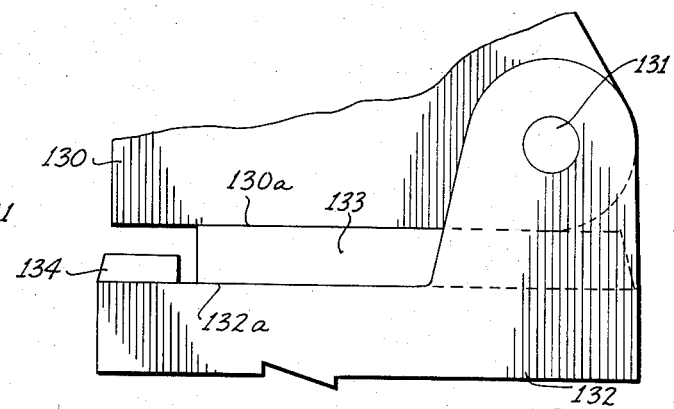

FIG. 19 illustrates stop means suitable for use in the structures shown in FIGS. 3, 5–8 and 13. In this figure, a lug 130 is pivoted (as at 131) to a mounting means 132. In the same manner shown in FIGS. 3, 5–8 and 13, a resilient member 133 is located between the lower surface 130a of the lug and the upper surface 132a of the mounting means and may be affixed to one or both of them.

The embodiment of FIG. 19 differs from those similar embodiments previously described in that the mounting means 132 has an upwardly extending stop 134 which will prevent downward movement of the lug 130 to the point where the resilient strength of the material 133 would be exceeded. The stop 134 may be a single upstanding member, as shown, or it may comprise two or more such members. The stop 134 may have any suitable width. It would also be within the scope of the invention to provide such a stop on the bottom surface 130a of the lug 130, rather than on the top surface of the mounting means 132 (as shown). In either event, the resilient member 133 will be protected.

Figure 20:
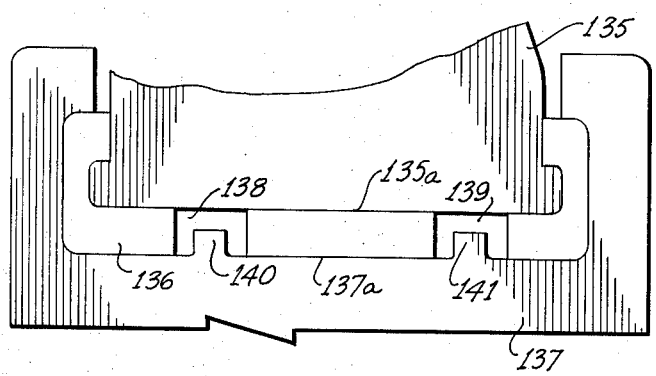

FIG. 20 illustrates stop means applicable to those structures shown in FIGS. 4 and 9–13. The figure fragmentarily illustrates a lug 135 having its bottom portion embedded in resilient material 136, which in turn is held in the mounting means 137. This structure differs from those shown in FIGS. 4 and 9–13 in that the resilient material is discontinuous, providing openings at 138 and 139. In these openings, the upper surface 137a of the mounting means 137 has upwardly extending stops 140 and 141. The stops 140 and 141 are adapted to contact the bottom surface 135a of the lug 135 before the resilient strength of the material 136 is exceeded.

Again, the stops 140 and 141 may be continuous, i.e. having a length at least equivalent to the width of the lug 135. On the other hand, each stop 140 and 141 may comprise more than one spaced, upwardly extending element. Again, as in the case of the structure of FIG. 19, it is within the scope of the invention to provide downwardly depending stop means on the bottom surface 135a of the lug 135. Such downwardly depending stop means would serve the same purpose as the upwardly extending stops 140 and 141.

In various embodiments taught above, wherein more than one resilient member is used, it is possible to provide more than one stop means. Thus, for example, the structure of FIG. 5 could employ stop means of the type shown in FIG. 16 as well as stop means of the type shown in FIG. 19. Similarly, the structure of FIG. 13 could employ stop means of the type shown both in FIG. 19 and 20.

It is also within the scope of the invention to provide stop means for the mechanical resilient members of FIGS. 14 and 15. As an illustration, stop means of the general type taught with respect to FIG. 16 could be applied to the abutment member 121 of FIG. 14. While the coil spring 125 will provide its own stop in that the convolutions will contact each other, a skirt could be applied to the abutment means 121 to prevent the coil spring 125 from becoming deformed under an extreme load.

Modifications may be made in the invention without departing from the spirit of it. For example, the male-female fit between the lug and cutter bit abutment surfaces, as illustrated in FIG. 1 and described with respect to FIG. 2, may be provided in the structures of FIGS. 3 through 6, 9, 10 and 18–20.

The resilient mounting means illustrated in FIGS. 3 and 4, as indicated above, are not limited with respect to the cutter bit and lug assemblies to which they may be applied. FIGS. 5 through 12 illustrate a plurality of cutter bit and lug assemblies, provided with resilient mounting means of the type shown in FIGS. 3 or 4. It will be understood by one skilled in the art, however, that other cutter bit and lug assemblies may be used. For example, a pick-type cutter bit, non-rotatively affixed in a lug may be provided with either of the resilient mounting means shown in FIGS. 3 and 4, as could a lug of the type capable of mounting means shown in FIGS. 3 and 4, as could a lug of the type capable of mounting well known trapezoidal bits, or the like.

The embodiments of the invention in which an exclusive property or privilege is claimed are defined as follows:

1. The combination of a cutting tool, a lug for supporting said cutting tool and a mounting means for said lug, said cutting tool comprising an elongated shank terminating at one end in a cutting tip and at the other end in an abutment surface, said lug comprising a body portion having a shank receiving perforation to receive the shank of said cutting tool, said shank receiving perforation having a forward end and a rearward end, said shank of said cutting tool being shiftable axially within said shank receiving perforation, a lug abutment surface in association with said rearward end of said shank receiving perforation, said lug abutment surface lying in a plane non-parallel with the axis of said perforation and cooperating with said abutment surface on said cutting tool shank, retaining means preventing the loss of said shank from said perforation, said lug being supported by said mounting means, said mounting means being capable of moving said cutting tool and lug in a cutting direction against material to be cut, and at least one block of resilient material in contact with said lug and in association with said lug abutment surface, at least a portion of said block of resilient material being unconfined and unenclosed to permit lateral distortion thereof, said block of resilient material having a transverse cross sectional area at least substantially equal to the transverse cross sectional area of said cutting tool, said block of resilient material being so positioned as to permit limited movement of said cutting tool in at least a direction substantially opposite to said cutting direction, said block of resilient material being of sufficient size and compressability that the load on said cutting tip is eased and a fracturing pressure is built up against material being cut when said block of resilient material is distorted, which fracturing pressure is released when said material gives way, imparting a kick to said cutting tool.

2. The structure claimed in claim 1 wherein said lug comprises a first element and a second element, said first lug element having said shank receiving perforation, a forward end facing in said cutting direction, a rearward end and a bottom surface extending therebetween, said second lug element having an upper surface corresponding to said bottom surface of said first lug element, said forward end of said first lug element being pivotally affixed to said second lug element with said bottom surface of said first lug element in spaced relationship to said upper surface of said lug element, a second block of resilient material located between said bottom and upper surfaces and affixed to at least one of said surfaces, a third block of resilient material supported by said mounting means, said second lug element having a bottom portion embedded in said third block of resilient material.

3. The structure claimed in claim 1 including stop means limiting the compression of said first block of resilient material to prevent the resilient strength thereof from being exceeded.

4. The structure claimed in claim 1 wherein said shank receiving perforation has a circular cross section, said cutting tool having a circular cross section of such diameter as to be freely rotatable within said shank receiving perforation.

5. The structure claimed in claim 4 including stop means in association with said lug abutment surface to prevent the resilient strength of said first block of resilient material from being exceeded.

6. The structure claimed in claim 4 wherein said lug comprises a body portion having a forward surface and a rearward surface, said shank receiving perforation extending through said body portion and forming openings in said forward and rearward surfaces, said lug having a rearwardly extending portion terminating in an anvil portion, said first block of resilient material being affixed to said anvil portion, an abutment means affixed to said first block of resilient material, said abutment means having said lug abutment surface thereon, said lug abutment surface facing said opening in said rearward surface of said lug body portion and being spaced therefrom.

7. The structure claimed in claim 6 wherein said lug has a bottom surface and said mounting means has a corresponding surface, the forward end of said lug being pivotally affixed to said mounting means with said bottom surface of said lug in spaced relationship to said corresponding mounting means surface, a second block of resilient material located between said lug bottom surface and said mounting means surface and being affixed to at least one of said last mentioned surfaces.

8. The structure claimed in claim 6 including a second block of resilient material supported by said mounting means, said lug having a bottom portion embedded in said last mentioned block of resilient material.

9. The structure claimed in claim 6 including at least one rearwardly extending element on said abutment means comprising a stop to protect said block of resilient material.

10. The structure claimed in claim 4 wherein said lug comprises a body portion having a forward surface and a rearward surface, said shank receiving perforation extending through said body portion and forming openings in said forward and rearward surfaces, said lug having a rearwardly extending portion terminating in an anvil portion, said first block of resilient material being affixed to said anvil portion, said first block of resilient material having said lug abutment surface thereon, said lug abutment surface facing said opening in said rearward surface of said lug body portion and being spaced therefrom.

11. The structure claimed in claim 10 wherein said lug has a bottom surface and said mounting means has a corresponding surface, the forward end of said lug being pivotally affixed to said mounting means with said bottom surface of said lug in spaced relationship to said corresponding mounting means surface, a second block of resilient material located between said lug bottom surface and said mounting means surface and being affixed to at least one of said last mentioned surfaces.

12. The structure of claim 10 including a second block of resilient material supported by said mounting means, said lug having a bottom portion embedded in said last mentioned block of resilient material.

13. The structure claimed in claim 10 wherein said block of resilient material has a perforation therein coaxial with said shank receiving perforation and a stop pin located within said perforation.

14. In a lug for a cutting tool of a mining machine and the like, the cutting tool being of the type having an elongated shank of circular cross section with a hard cutting tip at one end and an abutment surface at the other, said lug being of the type comprising a body portion having a forward surface and a rearward surface, said body portion having a shank receiving perforation extending therethrough and forming openings in said forward and rearward surfaces, said shank receiving perforation having a circular cross section of a diameter such as to permit free rotation of said cutting tool shank therein, said lug having a portion extending rearwardly of said body and terminating in an anvil, said anvil supporting a lug abutment means having a lug abutment surface adapted to cooperate with said shank abutment surface, said lug abutment surface facing said opening in said rearward surface of said lug body portion and being spaced therefrom, a first block of resilient material in contact with said anvil and in association with said lug abutment means, at least a portion of said first block of resilient material being unconfined and unenclosed to permit the lateral distortion thereof, said first block of resilient material having a transverse cross sectional area at least substantially equal to the transverse cross sectional area of said shank receiving perforation whereby, when said cutting tool is mounted in said shank receiving perforation, said first block of resilient material permits limited movement of said cutting tool in at least a direction substantially opposite to the cutting direction to ease the load on said cutting tip and to build up a fracturing pressure against the material being cut when said first block of resilient material is compressed, which fracturing pressure is released when said material being cut gives way, imparting a kick to said cutting tool.

15. The structure claimed in claim 14 including a mounting means for said lug capable of moving said lug in a cutting direction, said lug having a bottom surface and said mounting means having a corresponding surface, the forward end of said lug being pivotally affixed to said mounting means with said bottom surface of said lug in spaced relationship to said corresponding mounting means surface, a second block of resilient material located between said lug bottom surface and said mounting means surface and being affixed to at least one of said last mentioned surfaces.

16. The structure claimed in claim 14 including stop means limiting the compression of said first block of resilient material to prevent the resilient strength thereof from being exceeded.

17. The structure claimed in claim 14 wherein said first block of resilient material is affixed to said anvil, said lug abutment means being affixed to said first block of resilient material.

18. The structure claimed in claim 17 including a mounting means for said lug capable of moving said lug in a cutting direction, a second block of resilient material supported by said mounting means, said lug having a bottom portion embedded in said last mentioned block of resilient material.

19. The structure claimed in claim 17 including at least one rearwardly extending element on said abutment means comprising a stop to protect said first block of resilient material.

20. The structure claimed in claim 17 wherein said first block of resilient material has a perforation therein, said abutment means comprising a headed pin, said pin located within said perforation in said first block of resilient material and comprising a stop to protect said first block of resilient material, said head of said pin having said lug abutment surface thereon.

21. The structure claimed in claim 14 wherein said first block of resilient material is affixed to said anvil and comprises said lug abutment means with said lug abutment surface.

22. The structure claimed in claim 21 including a mounting means for said lug capable of moving said lug in a cutting direction, said lug having a bottom surface and said mounting means having a corresponding surface, the forward end of said lug being pivotally affixed to said mounting means with said bottom surface of said lug in spaced relationship to said corresponding mounting means surface, a second block of resilient material located between said lug bottom surface and said mounting means surface and being affixed to at least one of said last mentioned surfaces.

23. The structure claimed in claim 21 including a mounting means for said lug capable of moving said lug in a cutting direction, a second block of resilient material supported by said mounting means, said lug having a bottom portion embedded in said last mentioned block of resilient material.

24. The structure claimed in claim 21 wherein said first block of resilient material has a perforation therein, a pin located within said last mentioned perforation and acting as a stop to limit the compression of said resilient material.

* * * * *